Jan. 15, 1963 A. B. COHEN ET AL 3,073,953

PROCESS FOR PRODUCING IMAGES

Filed July 29, 1959

INVENTORS
ABRAHAM BERNARD COHEN
RUSSELL SEDGWICK HOLLAND

BY Lynn Barratt Morris
ATTORNEY 3,073,953
Patented Jan. 15, 1963

1

3,073,953

PROCESS FOR PRODUCING IMAGES

Abraham Bernard Cohen, Springfield, and Russell Sedgwick Holland, Milltown, N.J., assignors to E. I. du Pont de Nemours and Company, Wilmington, Del., a corporation of Delaware Filed July 29, 1959, Ser. No. 830,375
3 Claims. (Cl. 250—65)

Figure 1:
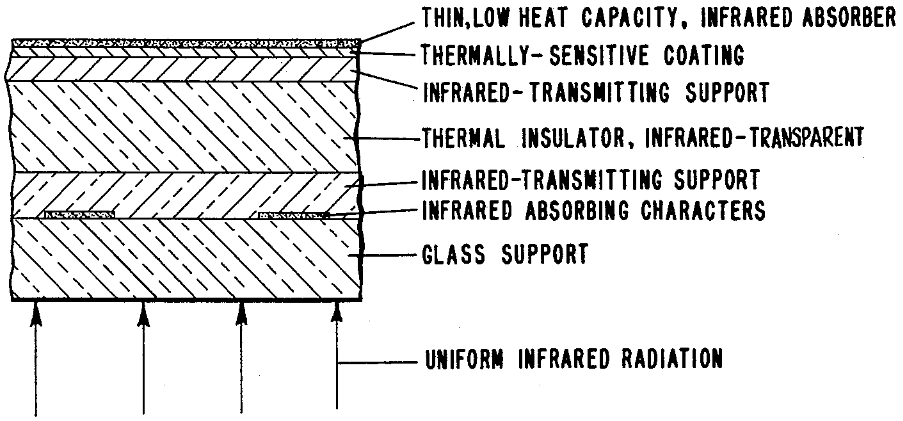

This invention relates to a process for the production of an image in a thermally-sensitive image-forming element. More particularly, it relates to a process for producing such an image by exposure to a pattern of infrared radiation.

A thermal image-forming process is known whereby a copy of a graphic original is produced by uniform exposure to radiant energy, the heat absorbing portion of the original converting absorbed radiant energy into a heat pattern which in turn causes an image of the original to be formed in a juxtaposed heat-sensitive copy paper. This process is simple, rapid, and produces a satisfactory contact copy by a completely dry process. It it not possible, however, to use such a process for projecting printing to obtain enlarged or reduced size images. The use of infrared patterns and the uniform infrared irradiation of a pattern of infrared absorbing material is known.

An object of this invention is to provide a new and practical process for producing images in thermally-sensitive, image-forming elements. Another object is to provide such a process which can be used to form images of reduced or enlarged size. Yet another object is to provide such a process which is simple to carry out and does not require expensive auxiliary materials or apparatus. A further object is to provide such a process which is dependable and can be readily carried out by the ordinary technician.

The novel process of this invention, in its broader aspects, comprises placing a thin, uniform radiation (e.g., infrared) absorbing layer of low heat capacity and low heat conductivity in contact with the surface of a thermally-sensitive, image-yielding layer of a recording element, exposing the layers in juxtaposition to infrared radiation from reverse image areas of an image-bearing element while interposing infrared radiation transmitting material of low heat conductivity between said image-bearing layer and said image-yielding layer. A given quantity of infrared radiation will produce the greatest rise in temperature within the absorbing layer when the layer has a very low heat capacity and is very thin, e.g., not more than 10 mils. The greater this temperature rise per unit of radiation absorbed, the greater will be the sensitivity of the system.

The process can be modified by combining the copying paper and the special infrared radiation absorbing layer into a single element. Thus, the support for the thermally sensitive image-yielding layer can be infrared absorbing, e.g., it can be coated or impregnated with copper chloride or said layer can be so coated or impregnated.

The infrared radiation transmitting material of low heat conductivity can be glass, a synthetic polymer, air or a combination of such materials. In the case where enlarged or reduced images are desired, the air space may be of considerable distance and a lens or series of lenses of high radiant energy, e.g., infrared radiation, transmission will be interposed between the image-bearing layer and the image-yielding layer.

Figure 2:
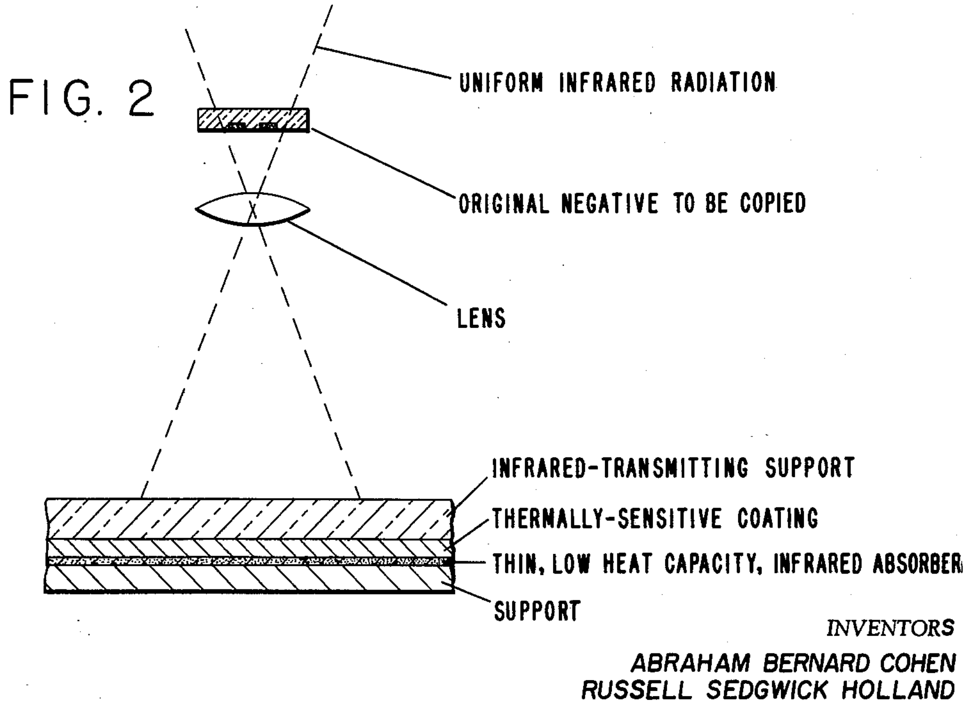

In the drawing of this application, FIG. 1 is a schematic view of the process of Example I, and FIG. 2 is a schematic view of the process of Example VII.

In a preferred embodiment of the invention, an image-bearing copy material consisting of infrared radiation

2 absorbing subject matter on an infrared transmitting support, e.g., a printed or typed page, is placed face down on a plate of glass. Above this is located a layer of infrared-transparent, thermal-insulating material, e.g., an air space or a sheet of polyethylene terephthalate photographic film base. Over the thermal insulating material is then placed a sheet of a thermosensitive copying paper, coated side up, and on top of this is placed a thin, uniform sheet of an infrared absorbing material having a low heat conductivity. When infrared radiation is uniformly directed upwardly through the glass plate a negative image of the graphic original is formed in the thermosensitive copying paper.

Thermosensitive copying papers used in this process are commercially available. Suitable such papers are commercially available under the trade name "Thermo-Fax" and are described in one or more of the following U.S. patents: 2,663,654; 2,663,655; 2,663,656; and 2,663,657, all issued December 22, 1953. Other useful thermosensitive elements are described in Howard U.S. application Ser. No. 770,012, filed October 28, 1958, Patent No. 2,950,987, August 30, 1960, and Holland et al., Ser. No. 807,761, filed Apr. 21, 1959.

The supports for the aforementioned image-yielding layer preferably are thin and flexible and essentially nonconductors of heat. Since the image is produced thermally, the support should not be a good conductor of heat. A heat-conductive support, e.g., a metal foil or a film or layer containing an appreciable amount of metal particles would absorb heat and prevent the formation of a sharp image. In general, the flexible support can be composed of an organic polymeric material having a softening point above the temperature at which the thermographic image is formed, e.g., above 150–225° C. Suitable such polymeric materials include paper, thin cardboard, self-supporting films composed of cellulose and regenerated cellulose; cellulose ethers, e.g., methyl cellulose, ethyl cellulose of low substitution; cellulose esters, e.g., cellulose triacetate; synthetic macromolecular polymers, including polyvinyl acetals, e.g., polyvinyl; formal; polyvinyl esters, e.g., polyvinyl acetate of low acetate content, and proteins, e.g., gelatin. Instead of films, the foregoing synthetic polymers can be layers on paper or another support. The supports can be used in the form of films and in the form of felted sheets made from fibers of the cellulosic or other polymeric materials referred to above.

The invention will be further illustrated by but is not intended to be limited to the following detailed examples.

*Example I*

A graphic image-bearing original consisting of a graphite pencil line drawing on a thin sheet of infrared transmitting tracing paper was placed, image side down, on an ordinary glass plate in a thermographic copying machine ("Premier Model 19 Thermo-Fax," sold by Minnesota, Mining & Mfg. Co.). Over the graphic original there was placed a sheet of a copolymer coated, polyethylene terephthalate photographic film base such as described in Alles, U.S. 2,779,864, which transmits infrared radiation but which serves as a thermal insulator. A sheet of thermographic copying paper ("Thermo-Fax") was, in turn, placed over the thermal insulator, coated side up. Finally, a thin sheet of infrared absorbing black paper was placed over the "Thermo-Fax" copying paper. After exposure at the number 3 setting of the thermographic copying machine, a clear negative image of the graphic original was formed in the "Thermo-Fax" copying paper.

*Example II*

Example I was repeated except that the original was a lithographic negative. With exposure as described in Example I, a clear positive copy was obtained in the thermosensitive copy paper.

*Example III*

Example I was repeated except that a silk screen having a thread thickness of 0.05 mm. and a thread count of 8 per mm. was substituted for the sheet of polyester photographic film base to act as a thermal insulator. The negative image thus obtained was very similar to that obtained in Example I.

*Example IV*

Example I was repeated except that a paper tissue ("S'wipe's," trademark registered U.S. Pat. Off., The General Cellulose Co., Inc., Garwood, N.J.), was substituted for the sheet of polyester photographic film base to act as an infrared light transmitting material of low heat conductivity. The negative image thus obtained was very similar to that obtained in Example I.

*Example V*

Example I was repeated except that a sheet of lithographic film, uniformly exposed to white light and processed to give a uniform, high-density layer of black metallic silver particles, was substituted for the black paper to act as an infrared light absorbing layer. The negative image thus obtained was very similar to that obtained in Example I.

*Example VI*

Example V was repeated except that the original was a thin, continuous-tone, photographic negative on cellulose triacetate base. A continuous tone positive image was obtained.

*Example VII*

A section of a line drawing reproduced as a negative image on lithographic film was mounted in a 2" x 2" slide mount and placed in a 1000 watt SVE slide projector equipped with a 7 inch, $f/3.5$ projection lens. The projected image was focused on a piece of commercial "Thermo-Fax" thermographic copying paper which was in contact with a sheet of lithographic film whach had been completely exposed and processed to give a uniform, thin layer of infrared absorbing silver. The thermographic copying paper and the lithographic negative were taped in contact with a white cardboard support as shown in FIG. 2. A heat bias was provided by directing forced hot air upon the thermographic copying paper from a hair dryer located about 10 inches from the copying paper. With the selection of a convenient ratio of lens-to-subject and lens-to-object distances and with a 30-second exposure through the projector, a positive copy was obtained having a 2.3 diameter magnification of the negative image.

*Example VIII*

Example VII was repeated except that the ratio of lens-to-subject and lens-to-object distances was chosen so as to obtain a reduction copy. It was necessary to extend the projector lens from its normal position and use a black paper tube to minimize reflections of stray light. By using a heat bias in the manner described in Example VII and exposing for 30 seconds a positive copy was obtained having a 2.7 diameter reduction of the negative image.

*Example IX*

Example V was repeated except that the thermographic copying paper consisted of a sheet of onionskin paper coated with a mixture of 3-cyano-4,5-dimethyl-5-hydroxy-3-pyrrolin-2-one and copper acetate as described in Example I of Holland et al., U.S. application Serial No. 807,761. Exposure consisted of 3 passes at settting "DK" of the machine described in Example I.

After exposure, the image was stabilized by dipping for 10 seconds in a solution of dilute HCl and washing for 30 seconds in water. After air drying, the resultant negative image was a pure white against a coal black background. Heating at 180° C. up to one minute had no effect on the copy so treated.

In order to increase sensitivity in the process of this invention the infrared absorbing backing layer may be provided with heating means to raise its temperature to just below the threshold temperature for image formation in the contiguous copying paper. This heating may be provided conveniently by an electric current through a thin layer of semiconducting medium such as silicon carbide, but may also be provided by other means, e.g.; uniform infrared radiation, forced hot air, etc.

The process of this invention is especially useful in the office copying field in making "contact" reproductions. The versatility of this process, however, also makes it possible to obtain copies which are enlarged or reduced from the size of the original by projection printing through a lens system. The process is adapted for thermographic oscillographic recording, whereby a moving spot of infrared radiation impinges on a thermosensitive element by reflection from a movable mirror.

The process of this invention makes it possible to obtain excellent copies of line and halftone originals rapidly, easily, and by a completely dry process.

Where an extremely high quality copy is desired, especially of archival quality, it is advantageous to employ the hydroxypyrrolinone-coated thermographic paper referred to in Example IX with the simple fixing operation described therein. Significant improvement in archival quality is obtained with such a paper using a plain water wash but, for highest quality, the dilute HCl treatment of Example IX is recommended.

The main advantage of this invention is its great versatility. While the process performs satisfactorily in the office copy field to make contact reproductions, it is also adaptable to projection copying when enlargement or reduction is desired. Still other advantages will be apparent from the foregoing description.

What is claimed is:

1. A process which comprises placing a thermally-sensitive layer of an image-yielding recording element in thermal contact with the surface of a thin uniform infrared radiation-absorbing layer, of low heat capacity and low thermal conductivity of a separate element, thermally insulating the opposite surface of the thermally-sensitive layer from an image-bearing element in juxtaposition by means of an intervening infrared transmitting material of low heat conductivity and exposing said image-bearing element to a source of continuous actinic radiation so that radiant energy from the reverse image areas of the latter element passes through the thermally insulating zone and then through the image-yielding layer to form a thermal image of the reverse image areas of the image-bearing element in the infrared radiation-absorbing layer, causing a visible image to be formed in said thermally-sensitive layer.

2. A process as defined in claim 1 wherein said infrared radiation-transmitting material is air.

3. A process as defined in claim 1 wherein a lens is disposed between the image-bearing element and the image-yielding layer whereby the image formed differs in size from the reverse, original image.

References Cited in the file of this patent

UNITED STATES PATENTS

| | | |
|---|---|---|
| 2,798,959 | Moncrieff-Yeates | July 9, 1957 |
| 2,859,351 | Clark et al. | Nov. 4, 1958 |
| 2,910,377 | Owen | Oct. 27, 1959 |
| 2,919,349 | Kuhrmeyer | Dec. 29, 1959 |